United States Patent
Makke et al.

(10) Patent No.: US 11,507,758 B2
(45) Date of Patent: Nov. 22, 2022

(54) VEHICLE-BASED SIGN LANGUAGE COMMUNICATION SYSTEMS AND METHODS

(71) Applicant: Ford Global Technologies, LLC, Dearborn, MI (US)

(72) Inventors: Omar Makke, Lyon Township, MI (US); Oleg Gusikhin, Commerce Township, MI (US); Ayush Shah, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 16/668,516

(22) Filed: Oct. 30, 2019

(65) Prior Publication Data
US 2021/0133290 A1    May 6, 2021

(51) Int. Cl.
| | | |
|---|---|---|
| *G06F 40/56* | (2020.01) | |
| *G06F 3/01* | (2006.01) | |
| *G10L 15/22* | (2006.01) | |
| *G01C 21/34* | (2006.01) | |
| *G06T 13/40* | (2011.01) | |
| *G09B 21/00* | (2006.01) | |
| *G06Q 50/30* | (2012.01) | |

(Continued)

(52) U.S. Cl.
CPC ......... *G06F 40/56* (2020.01); *G01C 21/3438* (2013.01); *G06F 3/016* (2013.01); *G06F 3/017* (2013.01); *G06Q 50/30* (2013.01); *G06T 13/40* (2013.01); *G06V 20/597* (2022.01); *G06V 40/28* (2022.01); *G09B 21/009* (2013.01); *G10L 15/22* (2013.01); *H04N 21/4856* (2013.01); *G06T 2207/30268* (2013.01)

(58) Field of Classification Search
CPC ...... G06V 40/28; G06V 20/59; G06V 20/597; G06F 3/017; G06F 3/167; G10L 15/26
See application file for complete search history.

(56) References Cited

U.S. PATENT DOCUMENTS

| | | | |
|---|---|---|---|
| 7,702,506 B2 | 4/2010 | Yoshimine | |
| 10,289,903 B1 * | 5/2019 | Chandler | G06N 3/08 |

(Continued)

FOREIGN PATENT DOCUMENTS

| | | |
|---|---|---|
| JP | 2008026653 A1 | 7/2006 |
| WO | 2015/143114 A1 | 3/2015 |

OTHER PUBLICATIONS

"The latest in car technology for people with hearing loss," Lisa A. Goldstein, Feb. 20, 2019; Web page <https://www.hearinglikeme.com/the-latest-in-car-technology-for-people-with-hearing-loss/html>, 3 pages, retrieved from the internet on Nov. 5, 2020.

*Primary Examiner* — Mark Villena
(74) *Attorney, Agent, or Firm* — Brandon Hicks; Eversheds Sutherland (US) LLP

(57) ABSTRACT

Vehicle-based sign language communication systems and methods are provided herein. An example device can be configured to determine a sign language protocol used by the first user, determine a target language used by a second user, obtain a translation library based on the sign language protocol and the target language, receive spoken word input from a second user through a microphone, convert the spoken word input into sign language output using the translation library, and provide the sign language output using a sign language output device.

20 Claims, 4 Drawing Sheets

(51) Int. Cl.
    *H04N 21/485*     (2011.01)
    *G06V 20/59*     (2022.01)
    *G06V 40/20*     (2022.01)

(56) References Cited

U.S. PATENT DOCUMENTS

| | | |
|---|---|---|
| 2007/0043503 A1* | 2/2007 | Oesterling ............ G01C 21/00 |
| | | 701/431 |
| 2014/0171036 A1 | 6/2014 | Simmons |
| 2014/0309806 A1* | 10/2014 | Ricci ...................... G06V 20/59 |
| | | 701/1 |
| 2016/0030744 A1* | 2/2016 | Hubert-Brierre ........................... |
| | | A61N 1/36039 |
| | | 607/57 |
| 2017/0316696 A1* | 11/2017 | Bartel ................ G06Q 10/0631 |
| 2018/0286392 A1* | 10/2018 | Min ........................ G06F 3/167 |
| 2019/0279529 A1* | 9/2019 | Al-Gabri ................ B25J 11/001 |
| 2019/0315227 A1* | 10/2019 | Kim ........................ G10L 15/22 |
| 2020/0356090 A1* | 11/2020 | Thakur ................ B60W 50/08 |
| 2021/0174034 A1* | 6/2021 | Retek ...................... G06F 3/014 |

\* cited by examiner

VEHICLE-BASED SIGN LANGUAGE COMMUNICATION SYSTEMS AND METHODS

TECHNICAL FIELD

The present disclosure relates to translation systems and methods and more particularly to systems and methods that provide for vehicle-based sign language translation and communication.

BACKGROUND

Ride-sharing services, which include both driver and driverless offerings, provide limited accommodations to individuals with a hearing impairment who rely on sign language communication. For example, a human driver of a vehicle may not have the ability to converse in sign language. Even if the driver were to communicate in sign language, it may distract the driver by requiring them to remove their hands from the steering wheel. While the hearing-impaired passenger may message the driver, it would be hard for the driver to read the message and reply to it safely. In some cases, the hearing impaired passengers may be tourists who speak different languages or the driver may speak a different language or both. A solution, such as a keyboard interface for the hearing-impaired passenger, does not provide a suitable solution due to the potential for motion sickness.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably. 100041

DETAILED DESCRIPTION

Overview

The systems and methods disclosed herein are configured to provide a means for a sign language speaker to converse with a person who is unable to speak in sign language. Generally, the systems and methods herein allow a user within a vehicle to communicate with a sign language speaking passenger using a camera to capture sign language, translate the sign language into a language used by the user, and output the translated sign language in a written or audible format. Similarly, the systems and methods can be configured to convert spoken word, textual, and/or natural language input into sign language output. The sign language output can be provided to the sign language speaker using a sign language output device. Example sign language output devices include, but are not limited to, an animated avatar, holograms, robotic hand(s), textual displays, or combinations thereof. In some embodiments, translation(s) services can be distributed to a cloud service provider for processing. In other embodiments, the vehicle-based controller can receive translation engines/libraries from the cloud service provider and perform translations at the vehicle level. According to some embodiments, the systems and methods herein can utilize haptic feedback or other tactile feedback to gain the attention of a hearing-impaired individual. In sum, the systems and methods herein provide for bi-directional communication between natural language speakers and sign language speakers.

Illustrative Embodiments

Figure 1:
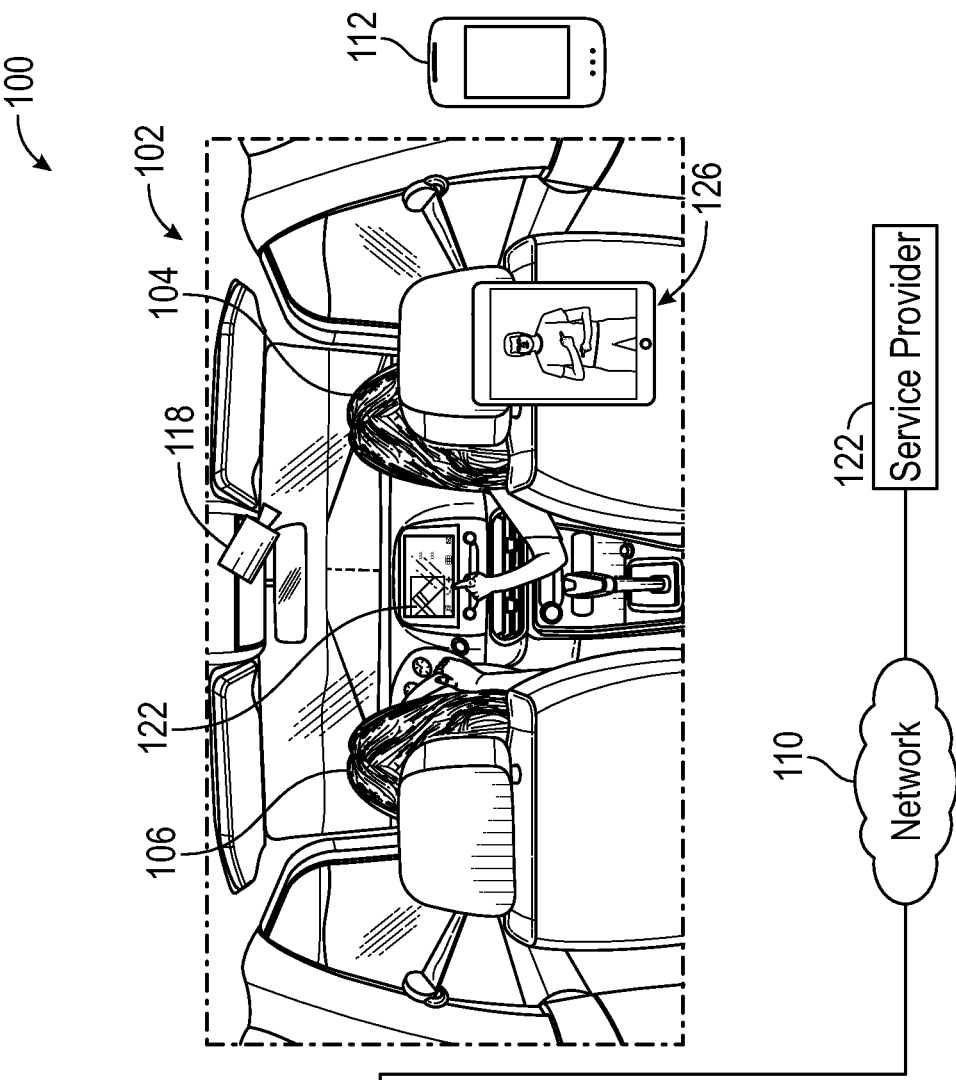
FIG. 1 depicts an illustrative architecture in which techniques and structures for providing the systems and methods disclosed herein may be implemented.
Figure 1:
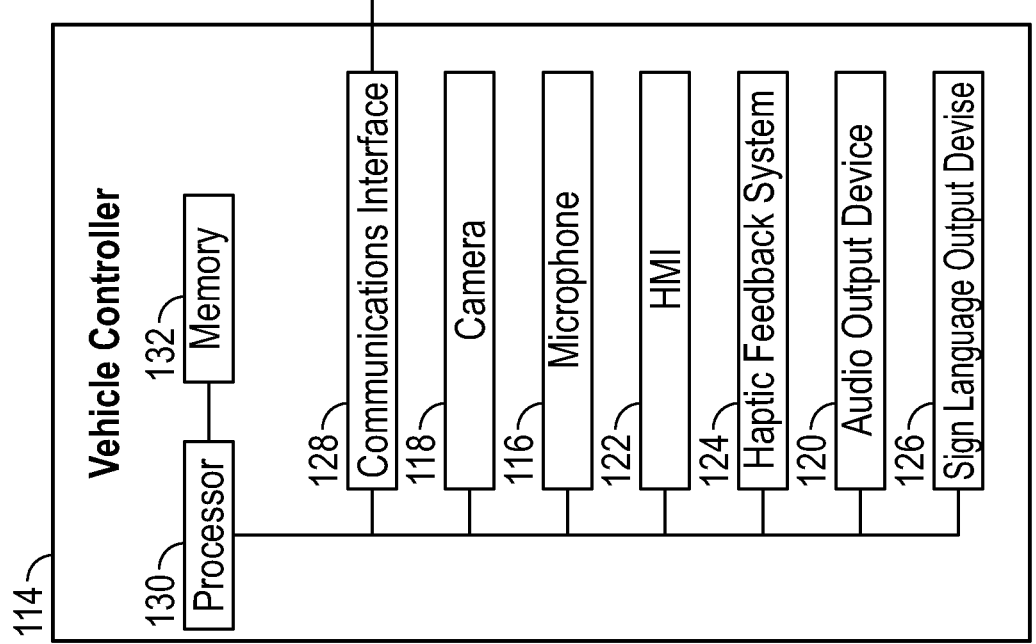

Turning now to the drawings, FIG. 1 depicts an illustrative architecture 100 in which techniques and structures of the present disclosure may be implemented. The illustrative architecture 100 may include a vehicle 102, a first user 104, a second user 106, a service provider 108, a network 110, and a mobile device 112. In some embodiments, the objects in FIG. 1 can communicate over a network 110 using any suitable communication interface(s). The network 110 may include any one or a combination of multiple different types of networks, such as cable networks, the Internet, wireless networks, and other private and/or public networks. In some instances, the network 110 may include cellular, Wi-Fi, or Wi-Fi direct.

Generally, the first user 104 is a sign language speaker and the second user 106 communicates through spoken word. To be sure, the second user 106 can include an individual who is unable to communicate using sign language or is a user such as a driver of the vehicle 102 who desires not to communicate using sign language. For example, the driver may not want to use sign language due to safety concerns. Broadly, the vehicle 102 is configured (as disclosed herein) to mediate communication between the first user 104 and the second user 106 using bi-directional translation between sign language and any spoken language. For example, the first user 104 speaks sign language and the second user 106, who is a driver of the vehicle 102, may speak English or any other known language. To be sure, there exist numerous types of sign language protocols and many spoken languages.

In various embodiments, the vehicle 102 can include an autonomous vehicle. The second user 106 could include a voice control system of the autonomous vehicle rather than a human being. Thus, a sign language speaker can interact with a voice control system of an autonomous vehicle using sign language. To be sure, in the various embodiments disclosed herein, the first user 104 (e.g., sign language speaker) can receive communications using a sign language output device of the vehicle 102. The sign language output device could provide an animated representation such as an avatar that communicates with the first user 104 through sign language. In other embodiments, the sign language output device could provide textual content, in addition to or in place of the avatar. In yet other embodiments, the sign language output device could include a robotic set of hands that provide the sign language speech.

In one embodiment, a passenger speaks in sign language. These sign language gestures are received through a camera.

This sign language input is translated into natural language or spoken words which are output to a driver through an audio device. The driver can speak back, and this speech is translated into sign language. The sign language output is provided to the passenger via a sign language output device (such as a three-dimensional animated person on a screen, a hologram, or a robotic arm).

According to various embodiments, the vehicle 102 comprises a vehicle controller 114, a microphone 116, a camera 118, an audio output device 120, a human-machine interface 122, a haptic feedback system 124, a sign language output device 126, and a communications interface 128. In another embodiment related to automated vehicles (AV), the sign language speaking passenger may want to communicate with remote customer support from within the vehicle. The system facilitates this communication efficiently using similar sign language-to-audible speech (and vice versa) translation. To be sure, while some embodiments disclose bi-directional speech conversion between a passenger and a driver, the present disclosure contemplates the bi-directional speech conversion between any sign language speaker and spoken word speaker, which could include a driver, another passenger, a remotely located customer service agent, or a voice control system of the vehicle—just to name a few. Also, in embodiments related to AVs, the AV could include an artificial intelligence engine or equivalent system that allows for conversation with a sign language speaking individual within the AV.

Turning now to a discussion of specific vehicle components, according to some embodiments, the vehicle controller 114 can comprise a processor 130 and memory 132. The memory 132 stores instructions, such as sign language translation logic that can be executed by the processor 130 to perform aspects of bi-directional sign language translation and communication. When referring to operations executed by the vehicle controller 114 it will be understood that this includes the execution of instructions by the processor 130.

The vehicle controller 114 can be configured to receive sign language input from the first user 104 using the camera 118. The vehicle controller 114 can receive spoken word input from the second user 106 through the microphone 116. The vehicle controller 114 can translate the sign language input into a first target language translation based on a known language type used by the second user 106. Further, the vehicle controller 114 can also provide the first target language translation through the audio output device 120, and convert the spoken word input into sign language output that is provided using the sign language output device 126.

The microphone 116 can be utilized to receive spoken language input from a user within the vehicle, such as the second user 106. In various embodiments, the spoken language input can be analyzed to determine a language type for the second user 106. For example, the vehicle controller 114 can be configured to analyze the spoken language input received through the microphone 116 to determine that the second user 106 is speaking in a particular language such as English or Spanish. In some embodiments, the vehicle controller 114 can transmit the spoken language input (or a sample thereof) to the service provider 108. The service provider 108 can analyze the spoken language input to determine the language type.

In various embodiments, the camera 118 is utilized to receive an image feed (e.g., sign language input) of the first user 104, who is providing sign language gestures. The camera 118 is positioned within the vehicle 102 so as to capture images of the first user 104 (or another passenger) who may be positioned in the front or back of the vehicle 102.

The vehicle controller 114 can be configured to determine a sign language protocol from the sign language input. In some embodiments, the first user 104 can select which sign language protocol they would like to use from a menu provided on an interface within the vehicle 102 or on their mobile device 112. Alternatively, the vehicle controller 114 can transmit the sign language input (or a sample thereof) to the service provider 108 for analysis. The service provider 108 can be configured to determine a sign language protocol from the sign language input. The vehicle controller 114 can access the network 110 using the communications interface 128 in order to communicate with the service provider 108.

When the sign language protocol for the first user 104 and the language type for the second user 106 are known, the service provider 108 can provide a translation library or engine to the vehicle controller 114 that allows the vehicle controller 114 to bi-directionally translate between the sign language protocol and the language type. The translation library could include a translation corpus or a translation table. In other embodiments, the service provider 108 can utilize machine translation or a translation memory. Rather than detecting sign language protocols and language types, the vehicle controller 114 or service provider 108 may receive selections or indications of these parameters from the first user 104 and the second user 106. For example, each of these users may create a user profile that can be stored at the vehicle controller 114 and/or service provider 108 level. A user could select their preferred language when creating a rideshare request (examples of which will be provided in greater detail herein).

In one or more embodiments, the vehicle controller 114 may receive sign language input from the first user 104 and determine the sign language content using, for example, pattern recognition. For example, the vehicle controller 114 can match the sign language input to patterns found in the sign language protocol. When a match is determined, a corresponding spoken language match may be found in the translation library. This spoken language match can be provided to the second user 106 as spoken language output provided through the audio output device 120. In various embodiments, the audio output device 120 is a speaker that outputs a synthesized human voice in the language type of the second user 106. In some embodiments, the audio output device 120 could be a component of the human-machine interface 122 or an integrated in-vehicle communications and entertainment system such as SYNC™. Stated otherwise, the vehicle controller 114 translates the sign language input of the first user 104 into a spoken or audible output that is provided for the second user 106. The translated content is referred to in some instances as a first target language translation. Thus, the first target language translation is provided through the audio output device for the benefit of the second user 106.

In order for the first user 104 to understand the spoken words of the second user 106, the microphone 116 receives spoken word or natural language input from the second user 106. The vehicle controller 114 then translates the same into sign language output using the translation library/engine. Broadly stated, the vehicle controller 114 can convert the spoken word input into sign language output. The sign language output can be further converted (if needed) into a format that can be displayed through the sign language output device 126.

According to some embodiments, the vehicle controller 114 can determine if the first user 104 is attentively watching for sign language responses or other messages by using facial recognition or other pattern matching. For example, the vehicle controller 114 can use images obtained from the camera 118 to determine if the first user 104 is looking at the camera 118. Stated otherwise the vehicle controller 114 can utilize the output of the in-vehicle camera to determine when the first user is looking at the sign language output device. The vehicle controller 114 may delay providing the sign language output when the first user 104 is not paying attention.

If the first user 104 is not paying attention, the vehicle controller 114 can activate the haptic feedback system 124. In one embodiment, the haptic feedback system 124 could include a vibrational element in a seat occupied by the first user 104. To gain the attention of the first user 104, the haptic feedback system 124 may be activated to vibrate the seat occupied by the first user 104. Vibrations provided through the haptic feedback system 124 can be activated immediately before the provision of sign language output that can be provided by the sign language output device 126. Alternatively, the vehicle controller 114 could activate a haptic feature on the mobile device 112 and/or provide the mobile device 112 with a message to look at the camera 118.

As noted above, natural or spoken language can be translated by the vehicle controller 114 into sign language based on a sign language protocol. For example, the first user 104 may speak American Sign Language (ASL). The second user 106 may speak French. The vehicle controller 114 can obtain a translation library (or equivalent) from the service provider 108 and perform ASL-to-French translation. When the vehicle controller 114 translates spoken French into ASL, the vehicle controller activates the sign language output device 126 to provide sign language output to the first user 104.

Figure 2A:
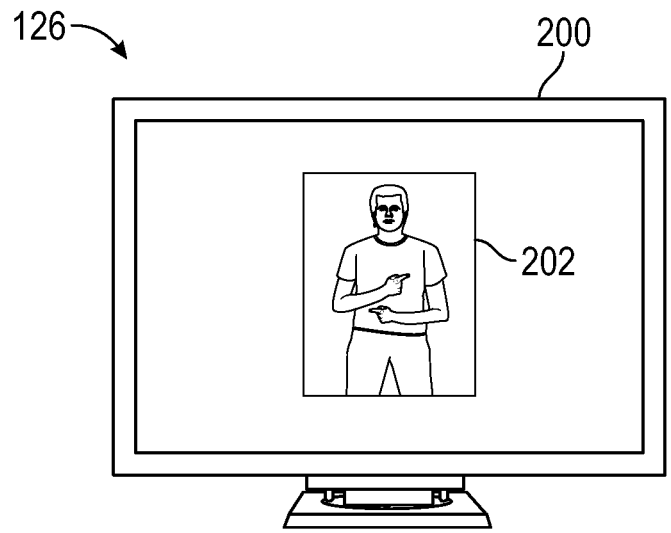
FIG. 2A is a perspective view of an example sign language output device in the form of a display with a three-dimensional avatar.
Figure 2B:
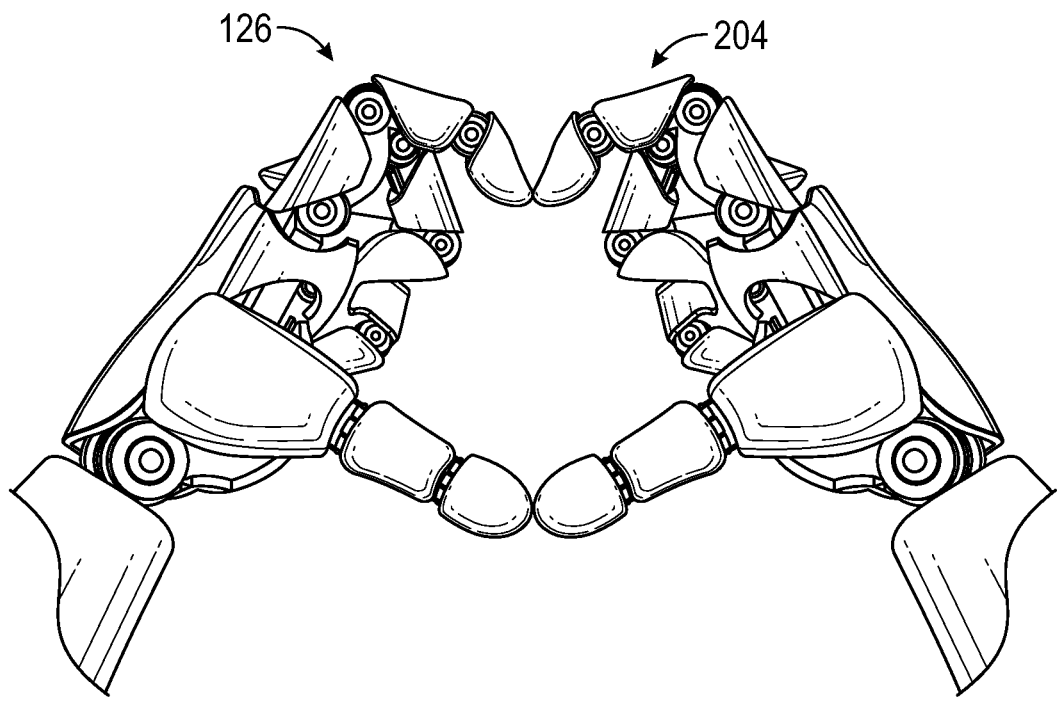
FIG. 2B is a perspective view of an example sign language output device in the form of robotic arms.

FIGS. 2A-2B collectively illustrate various embodiments of the sign language output device 126. For example, in FIG. 2A, the sign language output device 126 comprises a display 200 that includes a three-dimensional animation 202. In some embodiments, the three-dimensional animation 202 comprises a sign language avatar. The sign language avatar can act out the sign language output. The sign language avatar may include an entire representation of a person or only hands in some instances. In some embodiments, the display 200 can be integrated as part of the human-machine interface 122 of the vehicle 102. Thus, the first user 104 can utilize the display 200 to control other aspects of vehicle operations such as climate control and entertainment. The display 200 could also provide a keyboard as a backup method for interacting with the second user 106 if the translation service provided by the vehicle controller 114 becomes inoperable. In some embodiments, the display 200 can also provide textual content that corresponds to the sign language output. Thus, the first user 104 can engage in both expressive and receptive speech using the display 200, even when the sign language avatar is unavailable. The display 200 can also provide ancillary content to the first user 104 to supplement the sign language output provided. To be sure, in some embodiments, the display 200 can include the mobile device 112 of FIG. 1 rather than a dedicated in-vehicle display. Thus, the mobile device 112 could be communicatively coupled with the vehicle controller 114 of FIG. 1 through an application executing on the mobile device 112. Thus, the mobile device 112 is a sign language output device in some instances.

In FIG. 2B, the sign language output device 126 comprises a pair of robotic hands 204. The sign language output is provided through mechanized control of the robotic hands. That is, just as the translation library can be used for pattern matching to determine sign language input from the first user 104, where finger and hand position are identified to determine letters or words spoken in sign language, the finger and hand positions of the robotic hands 204 can be controlled to provide the sign language output to the first user 104.

In addition to providing spoken words to sign language translations, the vehicle controller 114 can also be utilized to translate between multiple spoken languages. For example, the first user 104 may speak with sign language, the second user 106 may speak English, but a third user (another passenger) may speak German. The vehicle controller 114 can multi-laterally translate between each of these languages. Thus, in some embodiments, the vehicle controller 114 can translate a first target language translation into a second target language translation.

A physical interface between the vehicle controller 114 and the sign language output device 126 could be a standard connection such as Ethernet for example. A virtual or short-range wireless connection can also be used. This allows for plug-and-play devices giving users different costs and options. For example a ride-share driver may choose a simpler solution than a professional mobility service.

Figure 3:
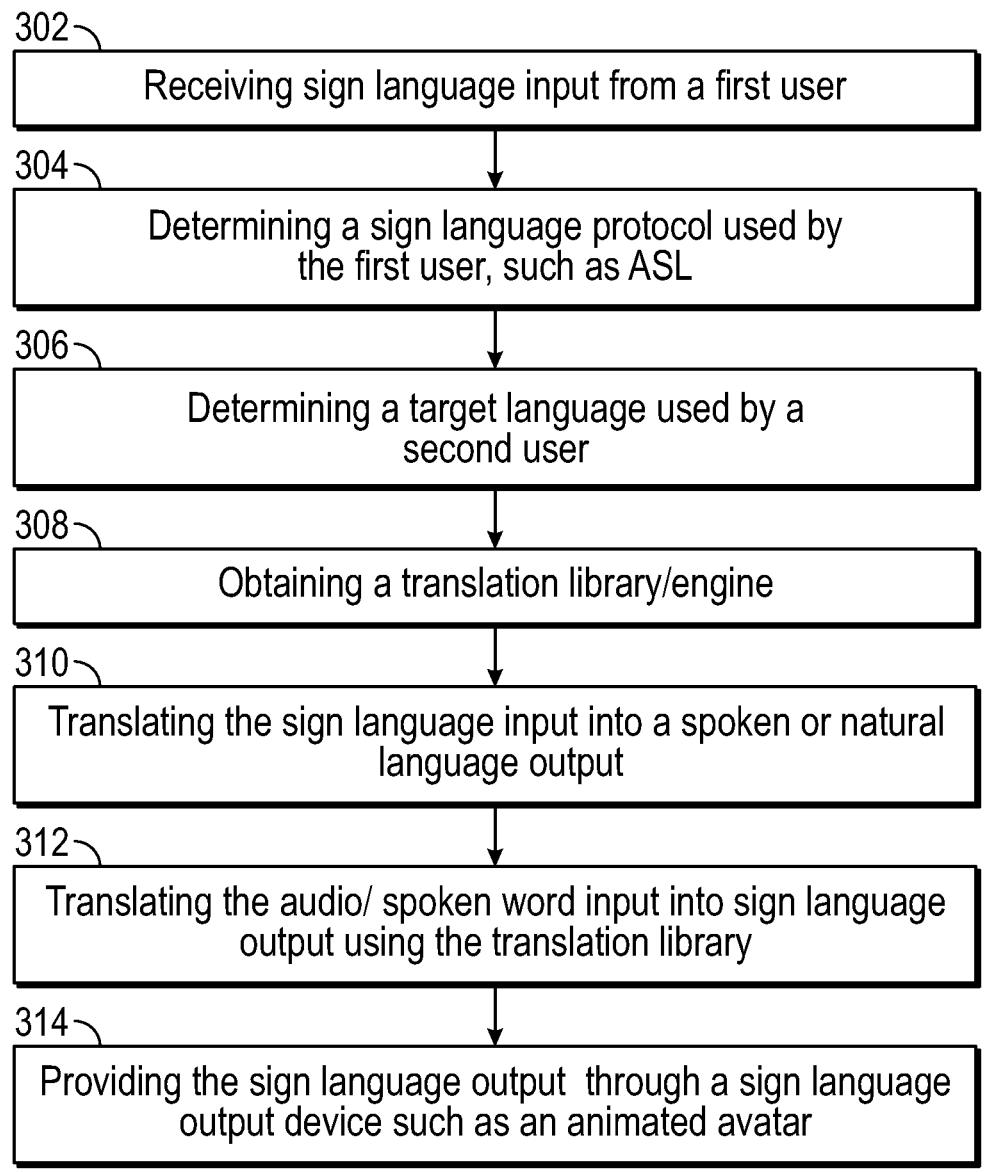
FIG. 3 is a flowchart of an example method of the present disclosure.

FIG. 3 is a flowchart of an example method for allowing a sign language speaker to converse with a non-sign language speaker in a vehicle. In some embodiments, the method includes steps associated with translating sign language into audible speech. The method can include a step 302 of receiving sign language input from a first user. The sign language input can include images obtained by a camera.

The method can include a step 304 of determining a sign language protocol used by the first user, such as ASL. Next, the method can include a step 306 of determining a target language used by a second user. For example, a passenger in a vehicle may not speak sign language but does speak English. The determination of the target language could occur through sampling of audio obtained using a microphone or from a selection made by the second user through an interface of the vehicle (such as the human-machine interface 122 of FIG. 1). In other embodiments, the target language could be determined from a user profile or from a user's input into an interface of the vehicle.

Once the sign language protocol for the sign language speaker and language type for the non-sign language speaker are known, the method can include a step 308 of obtaining a translation library or engine. Again, the translation library or engine can include any resource that allows for translation between sign language and a target language. In some embodiments the translation library or engine can be obtained from a service provider or other similar resource.

Next, the method includes a step 310 of translating the sign language input into a spoken or natural language output using the translation library or engine. In order for the sign language speaker to receive speech from a non-sign language speaker, the method includes a step 312 of receiving spoken word input from the second user. This spoken word input can include natural language or conversational speech. This speech can be captured by a microphone in the vehicle. The method can include a step 314 of translating the audio/spoken word input into sign language output using the translation library or engine. Once translated, the method can include a step 316 of providing the sign language output through a sign language output device such as a display that provides an animated avatar.

Figure 4:
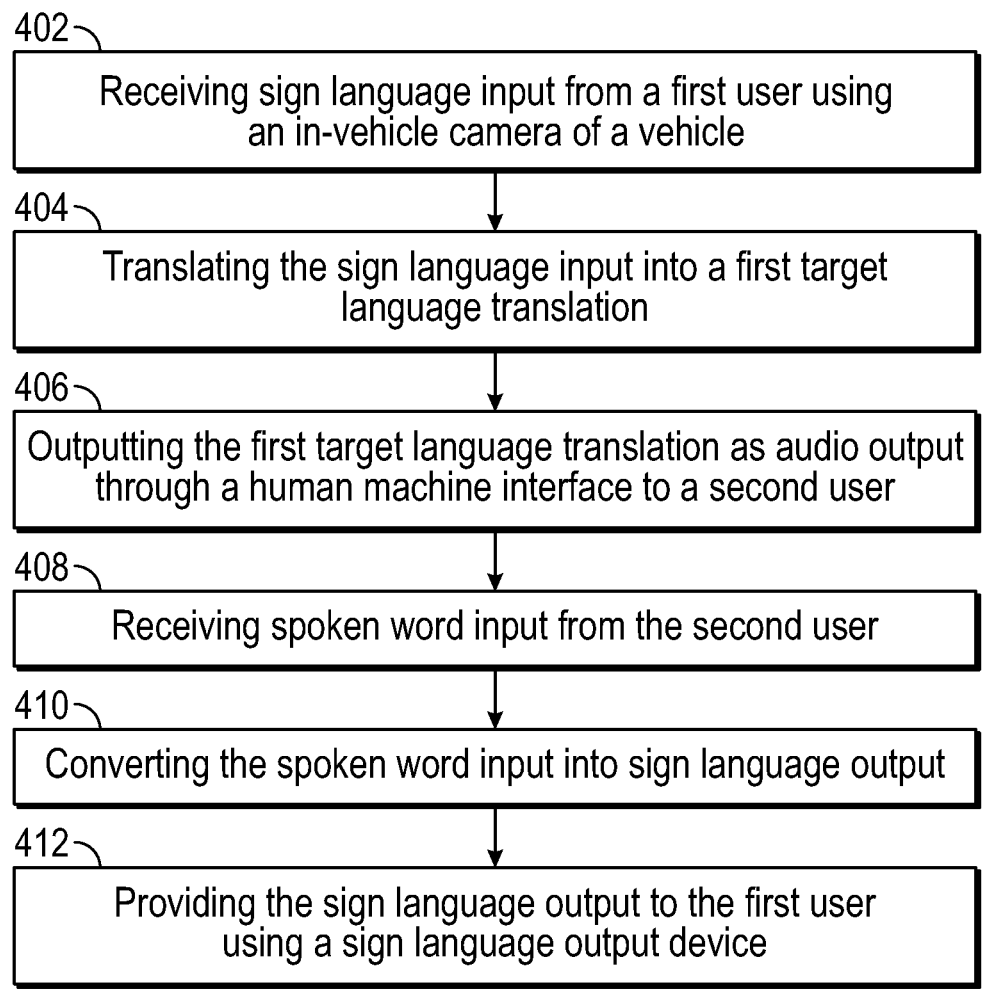
FIG. 4 is a flowchart of another example method of the present disclosure.

FIG. 4 is a flowchart of another example method wherein bidirectional communication is facilitated. The method includes a step 402 of receiving sign language input from a first user using an in-vehicle camera of a vehicle. Next, the method includes a step 404 of translating the sign language input into a first target language translation, as well as a step 406 of outputting the first target language translation as audio output through a human-machine interface to a second user. Steps 402-406 allow a sign language speaker to communicate expressively to a non-sign language speaker, such as a driver of a vehicle.

To allow the non-sign language speaker to communicate expressively with the sign language speaker, the method includes a step 408 of receiving spoken word input from the second user, as well as a step 410 of converting the spoken word input into sign language output. Once the sign language output is obtained, the method includes a step 412 of providing the sign language output to the first user using a sign language output device.

In view of the above, some example use cases are provided below that provide additional context for uses of the present disclosure. In one example use case, a passenger can schedule a ride using a ride-sharing service (could be provided through the service provider 108 system of FIG. 1). The request from the passenger indicates that they are a sign language speaker. Thus the ride-share request comprises a selection of sign language service from the first user and a selection of the sign language protocol (e.g., type of sign language spoken by the passenger).

The passenger can select during booking a type of sign language output device they desire and can make a choice accordingly if multiple options are available. The driver is notified that the ride is booked and that the passenger is hearing impaired. The vehicle controller transmits configurations such as sign language output device and SYNC language, version, camera specifications and so forth to the service provider. Examples of sign language output devices can include a display for animating 3D models with corresponding sign language, a hologram device, or a robotic arm which can mimic sign language, or other similar mechanisms.

Next, the vehicle can download appropriate translation engines/libraries from the service provider. Once the translation engines/libraries are loaded the driver picks up a passenger and the bi-directional translation process can proceed as needed. Alternatively, the translations may occur at the service provider level with the vehicle receiving audio output for the natural language speaker and sign language output for the sign language speaker.

In another example use case, when a driver speaks, audio is transmitted from the microphone to the vehicle controller, which translates the spoken word input into sign language output using the translation engines/libraries. In one or more embodiments, the vehicle controller can activate haptic feedback to obtain the passenger's attention. The camera can be used to observe the passenger to see if the passenger's attention is directed to the camera. Next, the sign language output is provided to the passenger through the selected sign language output device.

In use cases where no driver is present, the sign language speaking passenger can push call customer support button or interface to establish communication with a customer service agent. The passenger generates sign language input which is captured by the camera. The camera forwards the gestures to the vehicle controller which translates them to the proper driver's or customer service operator's language. In various embodiments, the passenger can be provided with an option to disable the translation services in case the passenger wants to communicate privately with another passenger.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
receiving sign language input from a first user using a camera of a vehicle;
translating the sign language input into a first target language translation;
outputting the first target language translation as audio output through an audio output to a second user;
receiving spoken word input from the second user;
translating the spoken word input into sign language output;
determining that the first user is paying attention to a sign language output device; and
providing the sign language output to the first user using the sign language output device based on the first user paying attention to the sign language output device.

2. The method according to claim 1, further comprising translating the first target language translation into a second target language translation.

3. The method according to claim 1, wherein the first target language translation is output in a natural language format.

4. The method according to claim 1, wherein providing the sign language output to the first user comprises displaying a sign language avatar based on a sign language protocol, wherein the sign language protocol comprises a type of sign language spoken by the first user.

5. The method according to claim 1, further comprising activating a haptic feedback on a seat associated with the first user based on the first user not paying attention to the sign language output device.

6. The method according to claim 1, further comprising utilizing output of the camera to determine when the first user is looking at the sign language output device.

7. The method according to claim 1, further comprising:
receiving a ride-share request comprising a selection of sign language service from the first user and a selection of a sign language protocol, wherein the selection of the sign language protocol indicates a type of sign language spoken by the first user; and selecting the vehicle in response to the ride-share request.

8. The method according to claim 7, further comprising:
determining a language type for the second user; and
receiving a translation library based on the language type and the sign language protocol.

9. A system, comprising:
a camera;
a microphone;
an audio output device;
a sign language output device; and
a vehicle controller comprising a processor and memory, the processor executing instructions stored in the memory to:
  receive sign language input from a first user using the camera;
  translate the sign language input into a first target language translation;
  output the first target language translation as audio output through the audio output device to a second user;
  receive spoken word input from the second user through the microphone;
  convert the spoken word input into sign language output;
  determine that the first user is paying attention to the sign language output device; and
  provide the sign language output using the sign language output device based on the first user paying attention to the sign language output device.

10. The system according to claim 9, further comprising obtaining a sign language protocol for the first user and a language library for the second user from a service provider, wherein the sign language protocol comprises a type of sign language spoken by the first user.

11. The system according to claim 10, wherein the first target language translation is output through the audio output device in a natural language format.

12. The system according to claim 11, wherein the vehicle controller is configured to provide the sign language output to the first user by generating an animated avatar that performs the sign language output according to the sign language protocol.

13. The system according to claim 9, further comprising a haptic feedback mechanism on a seat associated with the first user, wherein the vehicle controller is configured to activate the haptic feedback mechanism based on the first user not paying attention to the sign language output device.

14. The system according to claim 9, wherein the vehicle controller is configured to utilize output of the camera to determine when the first user is looking at the sign language output device.

15. The system according to claim 9, further comprising a service provider that is configured to:
  receive a ride-share request comprising a selection of sign language service from the first user and a selection of a sign language protocol, wherein the selection of the sign language protocol indicates a type of sign language spoken by the first user; and
  select the vehicle in response to the ride-share request.

16. The system according to claim 15, wherein the vehicle controller is further configured to:
  determine a language type for the first target language translation; and
  obtain a translation engine from the service provider based on the language type.

17. A device, comprising:
a processor; and
a memory for storing instructions, the processor executing the instructions to:
  determine a sign language protocol used by a first user;
  determine a target language used by a second user;
  obtain a translation library based on the sign language protocol and the target language;
  receive spoken word input from a second user through a microphone; and
  convert the spoken word input into sign language output using the translation library;
  determine that the first user is paying attention to a sign language output device; and
  provide the sign language output using the sign language output device based on the first user paying attention to the sign language output device.

18. The device according to claim 17, wherein the sign language output device comprises a mobile device of the first user.

19. The device according to claim 17, wherein the processor is configured to:
  receive sign language input from a first user using a camera;
  translate the sign language input into a spoken or natural language output using the translation library; and
  output the spoken or natural language output through an audio device.

20. The device according to claim 17, wherein the processor is configured to utilize output of a camera to determine when the first user is looking at the sign language output device.

* * * * *